United States Patent [19]
Koch et al.

[11] 4,265,254
[45] May 5, 1981

[54] APPARATUS FOR PERFORATING CIGARETTE PAPER OR THE LIKE

[75] Inventors: Franz-Peter Koch, Schwarzenbek; Peter Pinck, Gross-Hansdorf; Kurt-Eckard Petersen, Wentorf; Norbert Lange, Glinde; Elke Köhler; Ulrich Bornfleth, both of Hamburg, all of Fed. Rep. of Germany

[73] Assignee: Hauni-Werke Körber & Co. KG., Hamburg, Fed. Rep. of Germany

[21] Appl. No.: 963,087

[22] Filed: Nov. 22, 1978

[30] Foreign Application Priority Data

Dec. 5, 1977 [DE] Fed. Rep. of Germany ....... 2754104

[51] Int. Cl.³ .............................................. A24C 5/60
[52] U.S. Cl. ............................ 131/281; 219/121 LK; 219/121 LT; 219/121 LU; 219/121 L X; 219/121 LY; 219/121 LQ; 219/121 LR; 131/60
[58] Field of Search ..................... 131/20 R, 58, 23 R, 131/66, 21 R, 15 B; 219/121 LK, 121 LQ, 121 LR, 121 LS, 121 LT, 121 LU, 121 LV, 121 LA, 121 LY, 121 LZ

[56] References Cited

U.S. PATENT DOCUMENTS

| | | | |
|---|---|---|---|
| 3,291,136 | 12/1966 | Boyer | 131/15 B |
| 3,419,321 | 12/1968 | Barber et a;l. | 131/23 R UX |
| 3,808,394 | 4/1974 | Mominee et al. | 131/23 R UX |
| 4,013,261 | 3/1977 | Steigenwald et al. | 131/23 R UX |
| 4,032,743 | 6/1977 | Erbach et al. | 131/23 R UX |

Primary Examiner—V. Millin
Attorney, Agent, or Firm—Peter K. Kontler

[57] ABSTRACT

Apparatus for perforating a web of wrapping material or tubular wrappers of discrete filter cigarettes of unit length or double unit length in a filter tipping machine has a laser which is energizable at a frequency depending on the speed of the main prime mover of the machine to emit a beam which is reflected by a pivotable reflector to impinge alternately upon different portions of a single optical system or upon several discrete optical systems serving to focus the beam upon the web or upon discrete wrappers whereby the beam forms two or more rows or more complex patterns of perforations in the web or in the wrappers of successive cigarettes. The pivotable reflector can be omitted or is optional if a diffraction grating is placed in front of a single optical system so that the grating splits the beam into several discrete beams each of which is focused upon a different portion of the web or of the wrapper of a cigarette.

14 Claims, 9 Drawing Figures

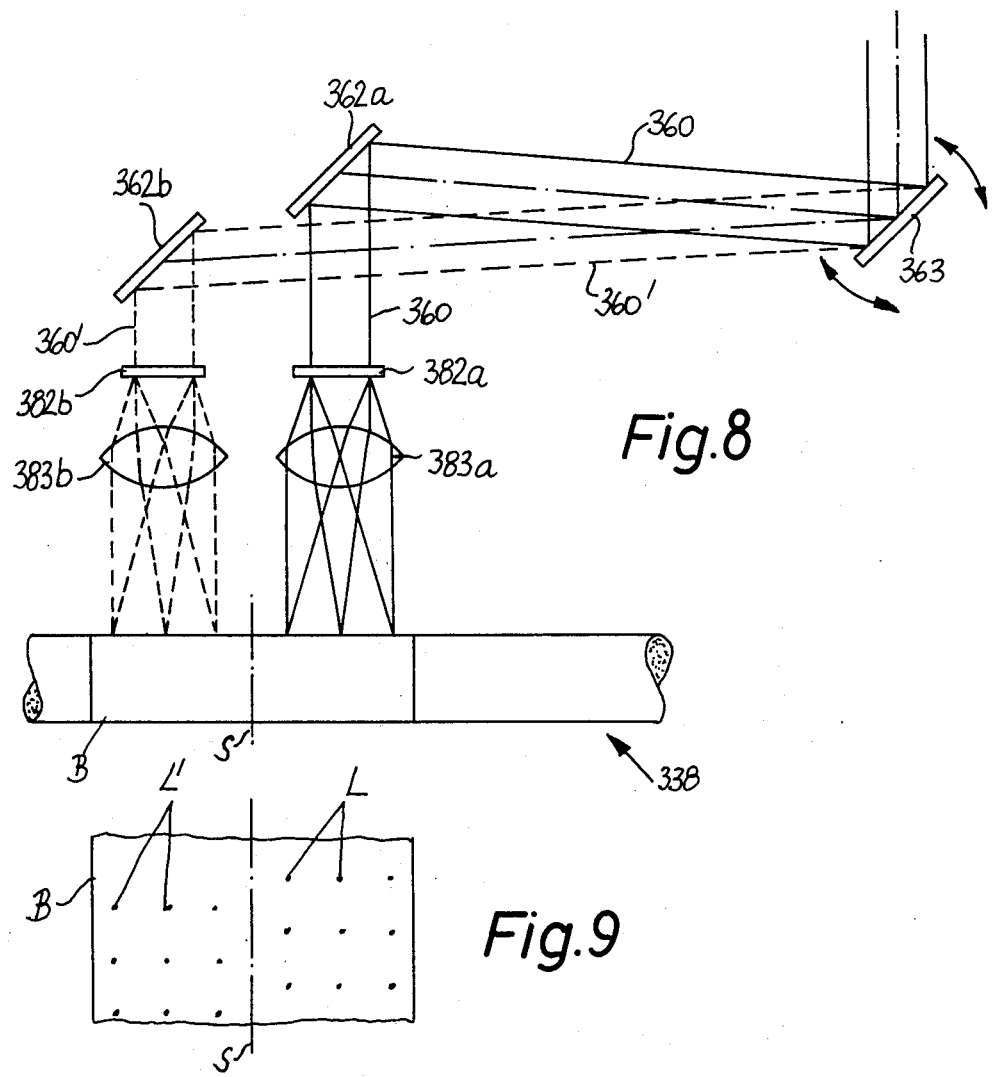

APPARATUS FOR PERFORATING CIGARETTE PAPER OR THE LIKE

BACKGROUND OF THE INVENTION

The present invention relates to apparatus for making holes in sheet material, especially for making holes in cigarette paper, imitation cork or like wrapping material for plain or filter tipped cigarettes, cigars or cigarillos and/or in wrapping material for filter mouthpieces which are combined or about to be combined with plain cigarettes, cigars or cigarillos to form filter tipped cigarettes, cigarillos or cigars. For the sake of simplicity, the invention will be described with reference to the making of perforations or holes in wrapping material for filter tipped cigarettes with the understanding, however, that the same apparatus can be used with equal advantage to make holes in wrappers of plain cigarettes or plain or filter tipped cigars or cigarillos or in the wrappers of filter mouthpieces (including simple mouthpieces, composite or multiplex mouthpieces as well as mouthpieces of the type known as recessed filters and mouthpieces for papyrossi or the like).

It is already known to equip a cigarette making or filter tipping machine with an apparatus which perforates the wrapping material to insure that a certain amount of atmospheric air can be admixed to the column of tobacco smoke in order to exert a beneficial influence on the quantity and effects of nicotine and/or condensate. It is also known to equip such apparatus with a source of coherent radiation, particularly a laser, which burns holes into the wrapping material, either prior to draping of such wrapping material around a filler consisting of tobacco and/or filter material or subsequent to draping, i.e., subsequent to severing of the web. For example, it is known to resort to a laser which burns holes into the outer tubular envelope of a filter mouthpiece at the inner end of the tobacco filler of a filter cigarette. At the present time, lasers are used to form a single row of perforations. Several rows of perforations can be formed by the obvious expedient of resorting to two or more lasers, i.e., by using a discrete laser for each row of perforations; however, this contributes excessively to the initial and maintenance cost of such apparatus. On the other hand, the making of two or more rows of perforations in one and the same wrapper is often desirable, for example, to perforate the outer envelope of a filter mouthpiece of double unit length which forms part of a filter cigarette of double unit length. By forming the envelope with two rows of perforations, one insures that a row of perforations is provided in the filter mouthpiece of each of two filter cigarettes of unit length which are obtained by severing a filter cigarette of double unit length midway across the filter mouthpiece. This holds true regardless of whether the perforations are formed in the web of wrapping material which is about to be converted into discrete uniting bands for connecting pairs of plain cigarettes with filter mouthpieces of double unit length or the perforations are formed in the tubular envelope which is obtained by convoluting a uniting band around a filter mouthpiece of double unit length and the adjacent end portions of corresponding plain cigarettes of unit length. Furthermore, it is often desirable to provide the wrapping material with several rows of perforations in order to enhance the appearance of the perforated zone and/or to achieve a more uniform mixing of cool atmospheric air with tobacco smoke.

As mentioned above, the provision of two or more discrete lasers contributes enormously to the initial cost of the machine which produces and/or processes the wrapping material.

OBJECTS AND SUMMARY OF THE INVENTION

An object of the invention is to provide an apparatus which can provide the wrappers of or for rod-shaped smokers' products with several rows or otherwise configurated arrays of perforations by resorting to a single source of coherent waves.

Another object of the invention is to provide an apparatus which can form a variety of relatively simple or relatively complex patterns of perforations, either in a continuous web or strip of wrapping material or in discrete portions or sections of such material, at the rate at which the web or its sections are processed in a high-speed machine for the making or manipulation of rod-shaped smokers' products.

A further object of the invention is to provide a novel and improved laser assembly which can be used in an apparatus of the above outlined character.

An additional object of the invention is to provide an apparatus which utilizes a single source of coherent radiation but is capable of providing wrapping material for filter cigarettes or the like with two or more rows of discrete perforations, with two or more rows of circularly distributed perforations or with two or more rows of otherwise arrayed perforations in such a way that the perforated sections of the wrapping material exhibit a desired degree of permeability to air.

Another object of the invention is to provide a compact perforating apparatus which can be combined with or incorporated in existing machines for the manufacture and/or processing of rod-shaped articles which constitute or form part of smokers' products.

A further object of the invention is to provide an apparatus which, though especially suited for use in or with filter tipping machines, can be used with advantage in other types of machines for the making and/or processing of rod-shaped articles which constitute or form part of smokers' products.

The invention resides in the provision of a perforating apparatus which is incorporated in or combined with a machine for the production and/or processing of rod-shaped articles which constitute or form part of smokers' products of the type having at least one tubular envelope constituting a section of a web of flexible wrapping material and surrounding at least one rod-like filler consisting of natural, reconstituted or imitation tobacco and/or filter material. The machine comprises a variable-speed electric motor, a variable-speed fluid operated motor or another suitable prime mover which determines the rate of production and/or processing of the articles. The apparatus serves to make holes or perforations in the wrapping material, i.e., in the web before the latter is subdivided into discrete sections, in the sections or in the tubular envelopes of discrete rod-shaped articles.

In accordance with one feature of the invention, the apparatus comprises means for advancing the wrapping material (i.e., the web, the sections or the tubular envelopes) along a predetermined path (toward a wrapping station where the web is or the sections of the web are draped around the fillers if the perforations are made in the web, or through a station where the rod-shaped articles rotate about their respective axes in the course of the perforating operation), a source of coherent radiation (preferably a laser), energizing means which is operable to energize the source so that the latter emits a beam of coherent radiation, optical means for focusing the beam upon the wrapping material in the predetermined path, mobile beam reflecting means interposed between the source and the optical means (such optical means may comprise one or more discrete optical systems), moving means (e.g., an arrangement including a reversible electric motor) which is actuatable to move the reflecting means between a plurality of different positions in each of which the optical means focuses the beam upon a different portion of the wrapping material in the predetermined path (the moving means preferably pivots the beam reflecting means between two or more different positions), means for operating the energizing means in synchronism with the operation of the prime mover, and means for actuating the moving means in synchronism with the operation of the prime mover. In accordance with a presently preferred embodiment of the just described apparatus, the latter comprises control means which is operatively connected with the prime mover and includes the aforementioned operating and actuating means. Such control means preferably further comprises a suitable programming unit, e.g., a unit employing a magnetic tape driven by the prime mover and several magnetic heads which track the tape and generate signals at a frequency which is a function of the rate at which the machine produces and/or processes rod-shaped articles. The signals are transmitted to the operating means for the energizing means and to the actuating means for the moving means.

In accordance with another feature of the invention, the apparatus comprises means for advancing the wrapping material (i.e., the web, the sections or the envelopes) along a predetermined path, a laser or another suitable source of coherent radiation, energizing means which is operable to energize the source so that the latter emits a beam of coherent radiation, optical means for focusing the beam upon the wrapping material in the predetermined path, a suitable diffraction grating interposed between the source and the optical means to split the beam into a plurality of discrete beams which simultaneously impinge upon different portions of the optical means and are focussed upon different portions of the optical means are focussed upon different portions of the wrapping material in the predetermined path, and means for operating the energizing means in synchronism with the operation of the prime mover.

The just mentioned optical means may comprise two or more discrete optical systems each of which is operatively associated with (i.e., located behind) a discrete diffraction grating. The apparatus then further comprises beam reflecting means, means for moving the beam reflecting means between several positions in each of which the beam impinges upon a different grating, and means for operating the moving means in synchronism with operation of the prime mover. It is also possible to employ one or more optical systems which are associated with diffraction gratings and one or more optical systems which are not associated with such gratings. Thus, one of the optical systems can focus several beams upon the moving wrapping material and another optical system focuses a single beam.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 8 is a fragmentary schematic view of a laser assembly which is designed to make six annuli of perforations in the uniting bands of filter cigarettes of double unit length; and FIG. 9 is a fragmentary developed view of a uniting band which is provided with perforations by resorting to the laser assembly of FIG. 8.

DESCRIPTION OF THE PREFERRED EMBODIMENTS

Figure 1:
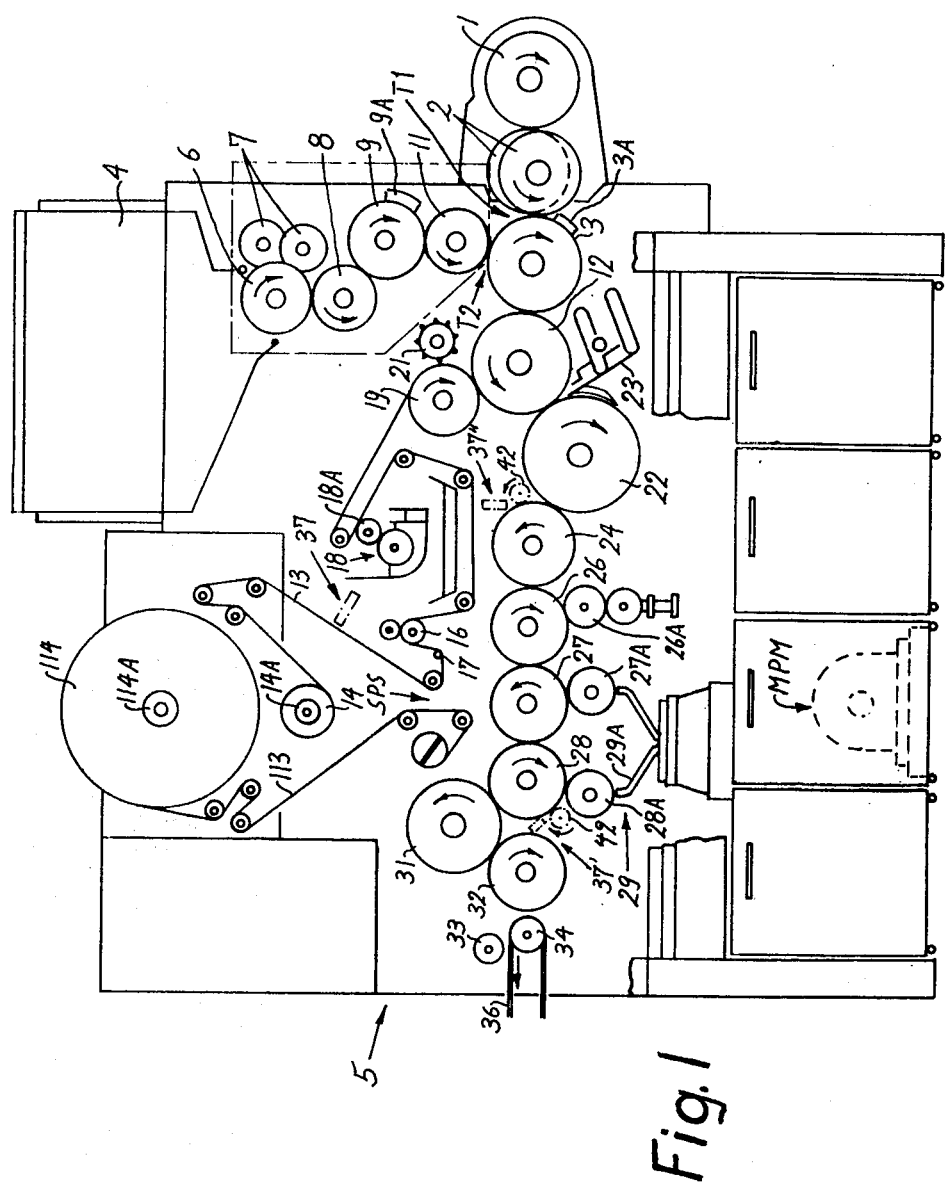
FIG. 1 is a schematic elevational view of a filter tipping machine for cigarettes which can be combined with or can incorporate a perforating apparatus embodying the present invention.

FIG. 1 shows a filter tipping machine of the type known as MAX S (produced by the assignee of the present application). The filter tipping machine is combined with or placed adjacent to a cigarette making machine which turns out plain cigarettes of unit length. FIG. 1 shows a rotary drum-shaped row forming conveyor 1 which forms part of the cigarette making machine (e.g., a machine known as GARANT, produced by the assignee of the present application) and is formed with peripheral flutes each of which is parallel to the axis of the conveyor and carries a plain cigarette PC (see FIG. 3) of unit length. The cigarettes in the oddly numbered flutes of the conveyor 1 form a first row which is adjacent to one axial end of the conveyor and the cigarettes in the evenly numbered flutes form a second row which is adjacent to the other axial end of the conveyor. This conveyor transports the cigarettes sideways.

The filter tipping machine comprises a frame or housing 5 which supports the conveyor 1 as well as two aligning conveyors 2 which respectively receive successive plain cigarettes of the first and second rows and transport such cigarettes through different distances and/or at different speeds so that each cigarette of one row is aligned with and spaced apart from a cigarette of the other row at a transfer station T1 where the conveyors 2 (each of which has peripheral flutes for plain cigarettes) deliver pairs of aligned cigarettes into successive flutes of a rotary drum-shaped assembly conveyor 3. The distance between the cigarettes in a flute of the conveyor 3 equals or exceeds the length of a filter mouthpiece of double unit length.

The frame 5 supports a magazine 4 for a supply of filter rod sections of six times unit length. The outlet of the magazine 4 supplies filter rod sections into the flutes of a rotary drum-shaped severing conveyor 6 which transports the sections past two rotary disk-shaped knives 7 located in different planes and serving to subdivide each filter rod section of six times unit length into three coaxial filter plugs of double unit length. Groups of three coaxial filter plugs each are transferred into the peripheral flutes of three rollers forming part of a staggering conveyor 8. The rollers of the staggering conveyor 8 rotate at different speeds and/or transport the respective filter plugs of double unit length through different distances so that the plugs of each group are staggered with respect to each other, as considered in the circumferential direction of the conveyor 8, and are delivered into successive peripheral flutes of a rotary drum-shaped shuffling conveyor 9 cooperating with one or more stationary cams 9A to form a single row of filter plugs which move sideways and are disposed one behind the other. A rotary drum-shaped accelerating conveyor 11 transfers successive filter plugs of the single row from the shuffling conveyor 9 into successive flutes of the assembly conveyor 3 at a second transfer station T2. The filter plugs of double unit length are introduced into the flutes of the assembly conveyor 3 in such a way that, once it advances beyond the transfer station T1, each filter plug is flanked by two plain cigarettes PC of unit length. The thus obtained groups (each of which contains a pair of coaxial plain cigarettes PC of unit length and a filter plug of double unit length therebetween) are thereupon advanced between two condensing cams 3A which cause the inner end portions of the plain cigarettes to abut against the adjacent end faces of the respective filter plug before the thus condensed groups are delivered into the peripheral flutes of a rotary drum-shaped transfer conveyor 12.

The frame 5 further supports a spindle 14A for a bobbin 14 consisting of a convoluted web 13 of wrapping material (such as cigarette paper, imitation cork or the like) which is drawn off the bobbin 14 by two advancing rolls 16 and is caused to pass over the relatively sharp edge of a curling device 17 (e.g., a device disclosed in the commonly owned U.S. Pat. No. 3,962,957 granted June 15, 1976 to Hinzmann). The leader of the web 13 is attracted by a driven suction drum 19 which causes the web to advance along the roller-shaped applicator 18A of a paster 18 which coats one side of the web 13 with a suitable adhesive. The suction drum 19 cooperates with a rotary knife 21 whose blades sever the leader of the web 13 at regular intervals so that the web yields a succession of adhesive-coated sections or uniting bands B (see FIG. 3). Successive uniting bands B are attached to successive groups of coaxial rod-shaped articles in the flutes of the transfer conveyor 12 in such a way that each uniting band extends substantially tangentially of the respective group and adheres to the filter plug as well as to the inner end portions of the respective plain cigarettes of unit length.

The transfer conveyor 12 delivers successive groups (each of which carries a uniting band B) onto the periphery of a rotary drum-shaped wrapping conveyor 22 which cooperates with a stationary or mobile rolling device 23 in order to convolute each uniting band B around the respective group so that the uniting band forms a tubular envelope which sealingly secures the corresponding filter plug of double unit length to the adjacent end portions of the respective plain cigarettes of unit length. Thus, each group which advances beyond the rolling device 23 constitutes a filter cigarette 38 (see FIG. 2 or 3) of double unit length. The wrapping conveyor 22 delivers successive filter cigarettes 38 of double unit length to a rotary drum-shaped drying conveyor 24 which is heated to promote setting of the adhesive on convoluted uniting bands (tubular envelopes) B and delivers successive cigarettes 38 to a severing conveyor 26 cooperating with a rotary disc-shaped knife 26A to subdivide each filter cigarette 38 into two coaxial filter cigarettes Z (see FIG. 4) of unit length. The plane in which the knife 26A severs successive cigarettes 38 is indicated in FIG. 3 by the phantom line S. The severing conveyor 26 may form part of a testing device which monitors the wrappers of cigarettes 38 and/or Z for the presence of holes or other defects and segregates unsatisfactory cigarettes 38 or Z from satisfactory cigarettes.

The severing conveyor 26 delivers pairs of coaxial filter cigarettes Z of unit length to the rotary drum-shaped conveyor 27 of a turn-around device 29 (e.g., a device of the type disclosed in commonly owned U.S. Pat. No. 3,583,546 granted June 8, 1971 to Gerhard Koop) which inverts the cigarettes Z of one row end-for-end and places the inverted cigarettes into the spaces between neighboring cigarettes Z of the non-inverted row. To this end, the turn-around device 29 comprises a second rotary drum-shaped conveyor 27A which removes one row of cigarettes Z from the conveyor 27 and delivers such cigarettes to the flutes of orbiting arms 29A which turn the cigarettes through 180 degrees and deliver them into the flutes of a further rotary drum-shaped conveyor 28A. The latter delivers the inverted cigarettes Z into alternate flutes of a fourth rotary drum-shaped conveyor 28 of the turn-around device 29. The conveyor 28 receives non-inverted cigarettes Z from the conveyor 27, and the inverted cigarettes are placed between the non-inverted cigarettes so that the conveyor 28 transports a single row of cigarettes Z wherein all of the filter mouthpieces (filter plugs of unit length) face in the same direction.

The conveyor 28 delivers successive filter cigarettes Z of unit length to the flutes of a rotary drum-shaped testing conveyor 31 whereon the ends of tobacco-containing portions of the cigarettes are tested for density and/or other characteristics. Cigarettes Z having defective tobacco-containing ends are segregated from satisfactory cigarettes Z on an ejecting conveyor 32 which delivers satisfactory cigarettes onto the upper reach of a take-off belt conveyor 36 trained over pulleys 34 (only one shown). The illustrated pulley 34 cooperates with a rotary braking drum 33. The upper reach of the belt conveyor 36 delivers satisfactory filter cigarettes Z to storage, to a tray filling device, to a variable-capacity reservoir, to a pneumatic sender or directly into the magazine of a packing machine, not shown.

FIG. 1 further shows a second spindle 114A for a fresh bobbin 114 containing a supply of convoluted web 113. The leader of the web 113 is attached to the web 13 at a splicing station SPS when the bobbin 14 is nearly exhausted. A suitable splicing device for use at the station SPS is disclosed in commonly owned U.S. Pat. No. 3,730,811 granted May 1, 1973 to Hans-Joachim Wendt.

The filter tipping machine comprises a perforating apparatus including a laser assembly 37 which is adjacent to the path of lengthwise movement of the web 13 upstream of the advancing rolls 16, (i.e., upstream of the wrapping mechanism including the conveyor 22 and rolling device 23), a laser assembly 37' which is adjacent to the conveyor 28 of the turn-around device 29, or a laser assembly 37" which is adjacent to the drying conveyor 24. Thus, the laser assembly 37 can form perforations in the web 13 or 113 before the web is subdivided into discrete sections, the laser assembly 37" can make perforations in the uniting bands (tubular envelopes) B of successive filter cigarettes 38 of double unit length, and the laser assembly 37' can make perforations in the uniting bands (tubular envelopes) BB of filter cigarettes Z of unit length.

Figure 2:
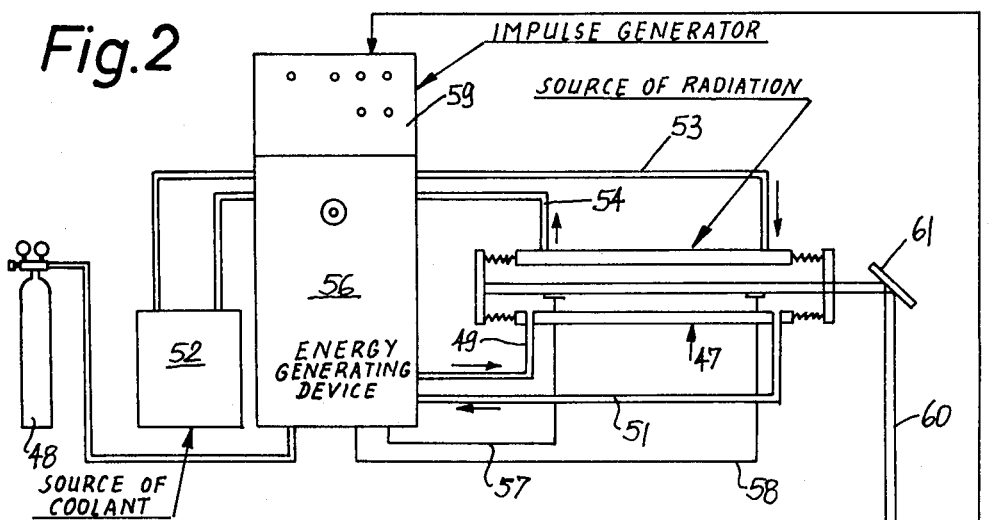
FIG. 2 is a schematic partly sectional view of a detail in the machine of FIG. 1 and a schematic view of a perforating apparatus which embodies one form of the invention and is designed to make holes in the uniting bands of filter cigarettes of double unit length.
Figure 3:
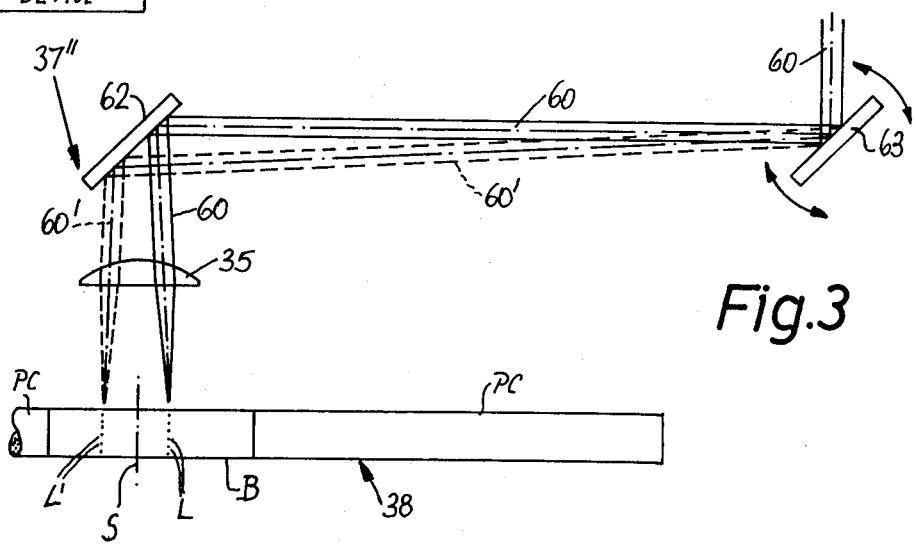
FIG. 3 is an enlarged view of certain details of the laser assembly of FIG. 2 and a side elevational view of a portion of a filter cigarette of double unit length which is in the process of being provided with two annuli of perforations.

FIGS. 2 and 3 illustrate the manner in which the apparatus including the laser assembly 37" makes perforations L and L' in the uniting bands B (namely, in the convoluted uniting bands or tubular envelopes) of discrete filter cigarettes 38 of double unit length. The drying conveyor 24 is a drum which is formed with peripheral flutes 39a and 39b extending in parallelism with the axis of the conveyor 24 and flanking elongated ribs 39d. The flutes 39a and 39b communicate with ports 41 which are machined into the body of the conveyor 24 and are connected to the suction intake of a pump or another suitable suction generating device SG during those intervals when they must attract the cigarettes 38.

The conveyor 24 cooperates with a rolling device 42 which constitutes or resembles a composite rotary drum and preferably includes three coaxial disks 42A each having three equidistant projections or lobes 43 with convex rolling surfaces 43A and three recesses 43B which alternate with the lobes 43. The distance between the convex surface 43A of that lobe 43 which travels past the conveyor 24 and a peripheral surface 44 of the conveyor 24 (between two neighboring ribs 39d) at most equals but is preferably at least slightly less than the diameter of a filter cigarette 38 of double unit length. The lobes 43 of all three disks 42A of the rolling device 42 are aligned with each other, as considered in the axial direction of the device 42. The median disk 42A engages the convoluted uniting band B substantially or exactly midway between the inner end portions of the respective plain cigarettes PC.

The conveyor 24 and rolling device 42 rotate in opposite directions (as indicated by the arrows). The laser assembly 37" is adjacent to the station R where successive cigarettes 38 are caused to roll about their respective axes during engagement by one of the peripheral surfaces 44 and one of the convex surfaces 43A on each of the three disks 42A of the rolling device 42. As shown in FIG. 1, the rolling device 42 can be installed in the frame 5 at the two o'clock position of the conveyor 24 and the laser assembly 37" is mounted at a level above the device 42. The laser assembly 37" comprises an optical system 35 which focuses laser beams upon selected portions of the uniting band B of that cigarette 38 which rotates about its own axis at the station R.

The source 47 (laser) of coherent radiation in the laser assembly 37" is connected with a source 48 of gas by a supply conduit 49 and an outlet conduit 51. Furthermore, the laser assembly 37" comprises a source 52 of coolant which is connected with the laser 47 by a supply conduit 53 and a return conduit 54, an energy generating device 56 with high-voltage terminals 57 and 58, and an impulse generator or energizing means 59. The beam 60 of radiation which is emitted by the source 47 is reflected by stationary reflectors or mirrors 61 and 62 and by a mobile (preferably pivotable) beam reflecting device 63 (e.g., a mirror) which is disposed in the path of the beam 60 downstream of the mirror 61 but upstream of the mirror 62. The latter reflects the beam 60 upon the optical system 35, i.e., upon the uniting band B of the cigarette 38 between the conveyor 24 and rolling device 42. The reflecting device 63 pivots about an axis which is located in the plane of FIG. 2 (i.e., not as shown in FIG. 2) so as to move the beam portion which impinges upon the mirror 62 at right angles to the plane of FIG. 2, i.e., in the axial direction of the cigarette 38 between the conveyor 24 and rolling device 42. Reference may be had to FIG. 3 which accurately shows the manner in which the device 63 is pivoted to change the path of the beam 60 between the optical system 35 and the uniting band B while the respective cigarette 38 rotates about its own axis.

The means 64 for moving the reflecting device 63 comprises a reversible electric motor 66 which receives signals (to pivot the reflector 63 between two predetermined end positions) from a circuit 67. The arrangement is similar to that known from the art of mirror galvanometers. The combination (63, 64) including the reflecting device 63, electric motor 66 and circuit 67 is a commercially available unit and is obtainable, for example, at General Scanning Inc., Watertown, Montana.

The laser assembly 37" further comprises a programming unit 68 which is common to the moving means 64 (circuit 67 and electric motor 66) and to the impulse generator or energizing means 59 for the laser 47. The programming unit 68 comprises a magnetic tape 71 mounted on a drum 69 and tracked by two signal transmitting scanning heads 72, 73. The head 72 is connected with the input of the circuit 67 by way of an actuating means here shown as a frequency-to-voltage converter 74. A second frequency-to-voltage converter 76 connects the head 74 with and constitutes a means for operating the energizing means 59. The drum 69 receives torque from the main prime mover MPM (FIG. 1) of the filter tipping machine and drives the rolling device 42 by way of a transmission 77 having a three-to-one ratio (because each disk 42A of the illustrated device 42 has three lobes 43). The information which is stored on the tape 71 and is reproduced by the heads 72 and 73 corresponds to the pattern of perforations L and L' (see FIG. 3) which is to be applied to each uniting band B. Such information is reproduced again and again, i.e., once during rotation of each of a series of successive filter cigarettes 38 at the station R. The programming unit 68 can be said to constitute one component of a control means which further includes the operating means 76 for the energizing means 59 and the actuating means 74 for the moving means. It will be noted that the laser 47 is energized and the reflecting device 63 is moved in synchronism with the operation of main prime mover MPM, i.e., at a frequency corresponding to the rate at which the machine of FIG. 1 produces and processes cigarettes Z. This insures accurate and reproducible timing of firing of the laser 47 with respect to the timing of movements of the reflecting device 63 and vice versa.

The operation of the perforating apparatus which includes the laser assembly 37" of FIGS. 2 and 3 is as follows:

The main prime mover MPM drives the moving parts of the filter tipping machine of FIG. 1, i.e., it rotates the drying conveyor 24 via shaft 24D and it also rotates the rolling device 42 via drum 69 for the tape 71 and transmission 77. The peripheral speeds of the surfaces 43A and 44 are identical except that such surfaces move in opposite directions. When a cigarette 38 which is attracted by the ports 41 of a flute 39a reaches the station R, it it engaged by the oncoming peripheral convex surface 43A of a lobe 43 (actually by the surfaces 43A on all three disks 42A of the rolling device 42) whereby it begins to rotate about its own axis by rolling rearwardly along the corresponding surface 44 from the flute 39a toward the oncoming flute 39b. During such rolling, the cigarette completes one revolution while remaining at the station R. This means that the entire exterior of the tubular envelope or uniting band B can be provided with a pattern of perforations or holes L and L' in response to transmission of signals from the heads 72, 73 to the moving means 64 and energizing means 59. A cigarette 38 in a flute 39a begins to rotate about its own axis as soon as it is engaged by the leading edges 43F of the corresponding set of three convex surfaces 43A.

The signals which are transmitted by the head 72 cause the electric motor 66 to pivot the relfecting device 63 between two end positions, and the signals which are transmitted by the head 73 cause the laser 47 to emit the beam 60 at selected intervals. The motor 66 pivots the reflecting device 63 from the one to the other end position between successive firings of the laser 47 whereby the beam 60 is alternately directed against the left-hand and right-hand portions of the rotating uniting band B (see FIG. 3) and provides the latter with two annuli or rows of perforations, namely, the annulus including the perforations L and the annulus including the perforations L'. The two annuli or rows are disposed at the opposite sides of the plane S where the cigarette 38 is thereupon severed by the knife 26A to yield two filter cigarettes Z of unit length. Successively emitted beams which form the perforations L are indicated in FIG. 3 at 60, and successively emitted beams which form the perforations L' are indicated at 60'. The beams 60 alternate with the beams 60' while the cigarette 38 rotates about its axis at the station R. When the cigarette 38 completes one revolution, it enters the oncoming flute 39b and is attracted to the conveyor 24 by the respective ports 41; at the same time, the trailing edges 43G of the corresponding set of surfaces 43A advance beyond such cigarette so that the latter ceases to rotate about its own axis and moves about the axis of the conveyor 24 to advance toward the periphery of the severing conveyor 26.

Figure 4:
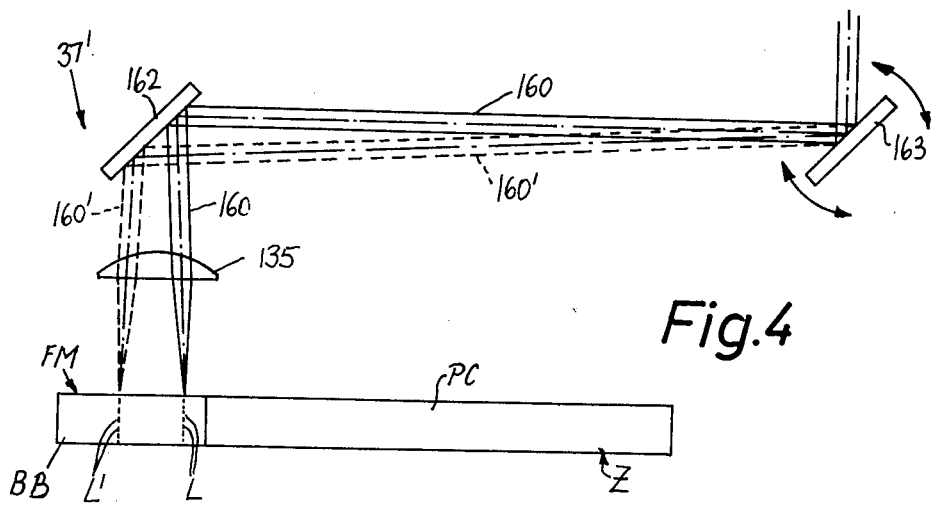
FIG. 4 is a similar view of a portion of a modified laser assembly which serves to make two annuli of perforations in the uniting bands of filter cigarettes of unit length.

The perforating apparatus can be used with equal advantage to make two rows of perforations in a filter cigarette Z of unit length in a manner as shown in FIG. 4. The laser assembly (37') of the perforating apparatus is then mounted adjacent to the path of movement of filter cigarettes Z, i.e., downstream of the severing conveyor 26 and preferably along a portion of the path where the filter mouthpieces FM of all cigarettes Z face in the same direction. Thus, and as shown in FIG. 1, the laser assembly 37' can be mounted adjacent to the conveyor 28 of the turn-around device 29. Each and every one of those flutes of the conveyor 28 which has advanced beyond the transfer station between the conveyors 28 and 28A carries a cigarette Z. FIG. 1 further shows that the rolling device 42 is then mounted adjacent to the conveyor 28, and it goes without saying that the conveyor 28 is or can be provided with pairs of flutes corresponding to the flutes 39a and 39b of FIG. 2.

If the laser assembly (37') is used to make holes or perforations L and L' in the uniting bands (tubular envelopes) BB of successive filter cigarettes Z, the pivotable reflecting device 163 of FIG. 4 directs the beams 160 and 160' against different portions of the optical system 135 which is located in the path of radiation reflected by the fixed mirror 162. The remaining parts of the perforating apparatus including the laser assembly 37' are identical or clearly analogous to those of the apparatus including the assembly 37"; therefore, they are not shown again in FIG. 4. It is clear that the extent to which the reflecting device 163 is pivoted by the corresponding electric motor need not be identical with the extent of pivoting of the device 63, either because the distance between the reflector 62 and device 63 is different from that between the reflector 162 and device 163 or because the manufacturer desires that the distance between the two annuli or rows of perforations L and L' in FIG. 4 be different from that between the annuli of perforations L and L' shown in FIG. 3.

The manner in which the perforating apparatus including the laser assembly 37 of FIG. 1 forms two rows of perforations in the web 13 is even simpler than the making of perforations in the tubular envelopes of cigarettes 38 or Z because the web 13 simply travels lengthwise past the laser assembly 37 and is formed with two rows of perforations in response to continuous pivoting of the movable reflecting device of the laser assembly between its two positions. The laser of the assembly 37 is fired whenever the pivotable reflecting device assumes one of its end positions, and the distances between neighboring perforations in each of the two rows are determined by the speed at which the rolls 16 advance the web 13 and the frequency at which the laser of the assembly 37 is fired. Save for the absence of transmission 77 and rolling device 42 of FIG. 2 (these parts can be omitted), the laser assembly 37 of FIG. 1 is identical with or clearly analogous to the assembly 37" of FIG. 2. The advancing rolls 16 perform a function which is analogous to that of the conveyor 24 and rolling device 42 of FIG. 2, i.e., the rolls 16 advance the web past the perforating station.

With reference to FIG. 3, and assuming that the laser assembly 37" performs the function of the laser assembly 37 of FIG. 1, the advancing rolls 16 transport the web 13 at right angles to the plane of FIG. 3, i.e., toward or away from the observer. Consequently, the beams 60 and 60' provide the web 13 with two parallel rows of perforations respectively including the holes L and L'.

Figure 5:
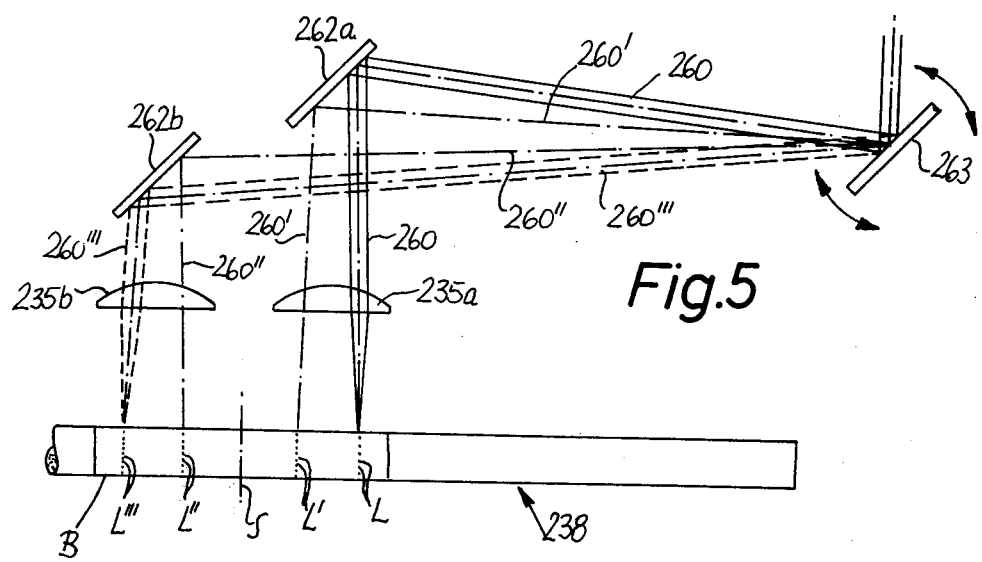
FIG. 5 is a similar view of a portion of a laser assembly which is utilized to make four annuli of perforations in the uniting bands of filter cigarettes of double unit length.

FIG. 5 illustrates a modified apparatus whose laser assembly is designed to provide the uniting bands (tubular envelopes) B of successive filter cigarettes 238 of double unit length with four annuli of perforations L, L', L" and L'''. This means that, when a cigarette 238 is severed midway across the band B, it yields two filter cigarettes of unit length each having a uniting band provided with two annuli of perforations L and L' or L" and L'". The plane where the cigarette 238 is severed downstream of the perforating station is indicated by the phantom line S. The convoluted uniting band B then yields two shorter uniting bands or tubular envelopes BB.

Those parts of the laser assembly of FIG. 5 which are identical with or clearly analogous to corresponding parts of the laser assembly of FIG. 4 or 3 are denoted by similar reference characters plus 100 or 200, respectively. The main difference is that the motor which moves the reflecting device 263 can pivot the latter between four different positions in which the laser beam is respectively reflected in a manner as shown at 260, 260', 260" and 260'". The beams 260 and 260' are reflected by a fixed reflector or mirror 262a to impinge upon different portions of a first optical system 235a and to form the perforations L and L'. The beams 260" and 260'" are reflected by a second reflector or mirror 262b to impinge upon different portions of a second optical system 235b and to form the annuli of perforations L" and L'". The level of the mirror 262a is higher than that of the mirror 262b so that the mirror 262a does not interfere with reflection of beams 260" and 260'" upon the mirror 262b or vice versa.

The provision of optical means including several discrete optical systems is desirable and advantageous in order to reduce the angles through which the reflecting device must be pivoted to assume two or more different positions in a predetermined sequence. Pivoting of the reflecting device through small angles is desirable because this reduces the length of intervals at which the laser can be fired (the duration of such intervals is dependent primarily or exclusively on the time which is required to move the reflecting device between different positions). As shown in FIG. 5, each discrete optical system is preferably associated with a separate fixed mirror or reflector.

Figures 6, 7:
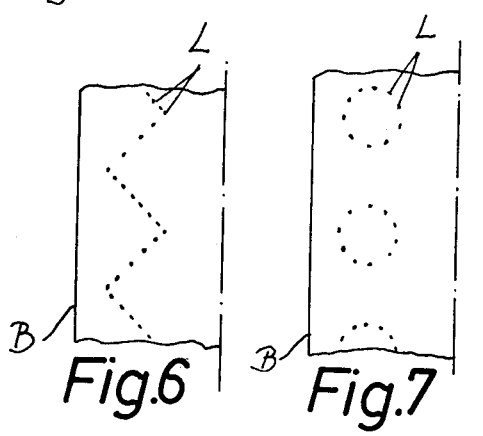
FIG. 6 is a fragmentary developed view of a portion of a uniting band which is formed with a zig-zag pattern of perforations.
FIG. 7 is a similar view of a portion of a uniting band which is formed with a pattern of perforations forming discrete circles.

FIGS. 6 and 7 show that the web 13 (or sections of the web 13, i.e., the uniting bands B or BB) can be provided with a number of different patterns or perforations L in the form of zig-zag lines (FIG. 6) or in the form of a series of circles (FIG. 7). A large number of other patterns can be obtained just as well. All that is necessary is to change the program which is stored on the magnetic tape. Each of the patterns which are illustrated in FIGS. 6 and 7 can be interpreted as consisting of several rows of perforations which extend circumferentially of the uniting band and include rows of equally spaced as well as rows of unequally spaced perforations. For example, the perforations at the three and nine o'clock positions of the circles shown in FIG. 7 form two parallel rows of equidistant perforations. The other perforations of the circles form rows of randomly or unequally spaced perforations (as considered in the direction of the line including the centers of the illustrated circles of perforations). The same holds true for the zig-zag pattern of perforations L which are shown in FIG. 6.

FIG. 8 shows a portion of a modified perforating apparatus including a laser assembly which can provide uniting bands B or a continuous web of wrapping material with perforations forming a pattern of the type shown in FIG. 9. The perforations L and L' at the opposite sides of the cutting plane (phantom line S) respectively form three annuli or rows which extend circumferentially of the convoluted band B.

The laser assembly of FIG. 8 comprises a reflecting device 363 which is movable (pivotable) between two predetermined end positions to respectively direct laser beams 360 and 360' against the reflecting surfaces of fixedly mounted mirrors or reflectors 362a and 362b. The mirror 262a directs the beam 360 against a diffraction grating 382a which splits the beam 360 into three discrete beams simultaneously focused upon the right-hand portion of the rotating uniting band B of a filter cigarette 338 of double unit length by an optical system 383a to form the three annuli of perforations L. Analogously, the mirror 362b reflects the beam 360' upon a diffraction grating 382b and the optical system 383b simultaneously focusses three discrete beams upon the left-hand half of the rotating uniting band B to form three annuli of perforations L'. The motor which pivots the device 363 between the end positions to respectively direct the beams 360 and 360' against the mirrors 362a and 362b is preferably identical with or analogous to the motor 66 of FIG. 2. The gratings 382a and 382b are preferably of the type having a high grating constant. The optical systems 383a and 383b conform to the design of the diffraction gratings.

An advantage of the laser assembly of FIG. 8 is that it can condense each of the beams 360 and 360' at several points, i.e., each of these beams can burn, simultaneously, several perforations into the uniting band B in response to firing of the laser. Though the density of energy is not uniform, each focused discrete beam can readily burn a hole into the uniting band B. The exact pattern of perforations which are formed by the beams 360 and 360' depends on the selected design of the diffraction gratings 382a, 382b and of the corresponding optical systems 383a and 383b.

The laser assembly including the structure of FIG. 8 can be used in lieu of the laser assembly 37, 37' or 37" of FIG. 1. Thus, such laser assembly can make perforations in a continuous web of wrapping material, in the uniting band of a filter cigarette of double unit length or in the uniting band of a filter cigarette of unit length. The number of points at which the optical system 383a or 383b focuses the respective beam upon the wrapping material can be reduced to two or increased to four or more.

The apparatus including the laser assembly of FIG. 8 can be modified by omitting the device 363 (or by replacing this device with a fixed reflector), by omitting the fixed mirror 362a or 362b, by omitting the diffraction grating 382a or 383b and by omitting the optical system 383a or 383b. Such simplified apparatus can make a pattern of perforations in a running web, in a convoluted uniting band B or in a convoluted uniting band BB. For example, if the apparatus comprises only the mirror 362a, the diffraction grating 382a and the optical system 382a, it can provide a uniting band BB with three rows of perforations even though the mobile reflecting device 363 is dispensed with. Furthermore, the grating 382a or 382b can be omitted so that the apparatus including the structure of FIG. 8 provides a web or a uniting band with four rows of perforations, namely with the three rows which are formed by coherent beams focused by the optical system 383b or 383a and the beam focused by the optical system 383a or 383b.

An important advantage of a perforating apparatus which operates with a diffraction grating but does not embody the mobile reflecting device is that the laser can be fired at a much higher frequency than when the reflecting device must be moved to different positions between successive firings.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. In a machine which produces and/or processes rod-shaped articles constituting or forming part of smokers' products of the type having at least one tubular envelope constituting a section of a web of flexible wrapping material and surrounding at least one rod-like filler, the combination of means for advancing the wrapping material along a predetermined path; a prime mover operative to determine the rate of production and/or processing of rod-shaped articles and arranged to drive said advancing means; and an apparatus for making perforations in the wrapping material, said apparatus comprising a source of coherent radiation, energizing means operable to energize said source so that the latter emits a beam of coherent radiation, optical means for focusing said beam upon the wrapping material in said path, mobile beam reflecting means interposed between said source and said optical means, moving means actuatable to move said reflecting means between a plurality of positions in each of which said optical means focuses said beam upon a different portion of the wrapping material in said path, means for operating said energizing means in synchronism with the operation of said prime mover, and means for actuating said moving means in synchronism with the operation of said prime mover.

2. The combination of claim 1, wherein said moving means includes means for pivoting said beam reflecting means between said positions.

3. The combination of claim 1, further comprising control means operatively connected with said prime mover and including said operating and actuating means.

4. The combination of claim 3, wherein said control means further comprises a programming unit having means for operating said energizing means and for actuating said moving means at a frequency which is a function of the rate of production and/or processing of said articles.

5. The combination of claim 1, wherein said moving means comprises an electric motor and a circuit for said motor, said circuit being connected with said actuating means.

6. The combination of claim 1, wherein said optical means comprises a plurality of discrete optical systems and further comprising a plurality of fixed reflectors, one for each of said systems, and each disposed in the path of said beam in a different position of said beam reflecting means to direct the beam upon the respective optical system.

7. The combination of claim 6, wherein said optical means consists of two discrete optical systems.

8. The combination of claim 1, wherein said source is a laser.

9. The combination of claim 1, wherein said advancing means includes means for moving the web lengthwise past said optical means.

10. The combination of claim 9, further comprising means for wrapping the perforated web around the fillers downstream of said optical means, as considered in the direction of movement of the web.

11. The combination of claim 1, wherein said advancing means comprises means for transporting discrete rod-shaped articles seriatim along said path so that said beam perforates the envelopes of successive articles.

12. The combination of claim 11, wherein said transporting means includes means for rotating successive articles about their respective axes during impingement of said beam upon the envelopes of the respective articles.

13. The combination of claim 12, wherein said rotating means comprises a rotary conveyor having a first rolling surface, a rolling device adjacent to said conveyor and having a second rolling surface defining with said first surface a gap having a width less than the diameter of an article, and means for moving said surfaces in opposite directions but at identical speeds so that an article whose envelope is engaged by said surfaces rotates about its axis but remains in the path of the beam which is focused by said optical means.

14. The combination of claim 13, wherein said conveyor comprises means for moving successive articles away from the path of said beam after the articles complete one full revolution about their respective axes.

* * * * *